US010203849B2

(12) United States Patent
Liu

(10) Patent No.: US 10,203,849 B2
(45) Date of Patent: Feb. 12, 2019

(54) MULTIMEDIA PLAYING METHOD AND APPARATUS BASED ON ANDROID SYSTEM

(71) Applicant: AutoChips Inc., Hefei, Anhui Province (CN)

(72) Inventor: Baobao Liu, Hefei (CN)

(73) Assignee: AUTOCHIPS INC., Hefei, Anhui Province (CN)

(*) Notice: Subject to any disclaimer, the term of this patent is extended or adjusted under 35 U.S.C. 154(b) by 387 days.

(21) Appl. No.: 15/157,417

(22) Filed: May 18, 2016

(65) Prior Publication Data

US 2016/0342298 A1 Nov. 24, 2016

(30) Foreign Application Priority Data

May 22, 2015 (CN) .......................... 2015 1 0268439

(51) Int. Cl.
H04N 7/00 (2011.01)
H04N 5/00 (2011.01)
H04N 5/91 (2006.01)
G06F 3/048 (2013.01)
G06F 3/0484 (2013.01)
G06F 3/0482 (2013.01)
G06F 17/30 (2006.01)

(52) U.S. Cl.
CPC .......... *G06F 3/0484* (2013.01); *G06F 3/0482* (2013.01); *G06F 17/30058* (2013.01); *G06F 17/30076* (2013.01)

(58) Field of Classification Search
CPC .. H04N 21/84; H04N 21/8106; G11B 27/034; G11B 2220/2562; G11B 27/105; G11B 27/329; G11B 2220/2579; G06Q 10/107; G06F 3/0484; G06F 17/30058; G06F 17/30076; G06F 17/30772; G06F 17/218; G06F 17/0482; H04L 51/08; H04L 51/12
See application file for complete search history.

(56) References Cited

U.S. PATENT DOCUMENTS 8,660,406 B2 * 2/2014 Tanaka ................. G11B 27/105
386/247
9,137,507 B2 * 9/2015 Gandolph ............... G06F 9/445
9,529,492 B2 * 12/2016 Cho ..................... G06F 3/04817
(Continued)

FOREIGN PATENT DOCUMENTS

CN 1889652 A 1/2007
CN 101072250 A 11/2007
WO 01/01415 A1 1/2001

*Primary Examiner* — Thuy Dao
(74) *Attorney, Agent, or Firm* — Cheng-Ju Chiang

(57) ABSTRACT

The present disclosure provides a multimedia playing method and apparatus. The multimedia playing method includes: loading a source file and parsing a file header of the source file in order to determine whether the source file is a predefined format file, wherein the predefined format file includes menu information, and the menu information further includes default start menu information, at least two titles, at least one button for selecting a corresponding title and data for indicating the corresponding relations between the buttons and the titles; if the source file is a predefined format file, storing the menu information, and obtaining the default start menu information; extracting and playing the corresponding data of the current title.

15 Claims, 4 Drawing Sheets

(56) References Cited

U.S. PATENT DOCUMENTS

| | | | |
|---|---|---|---|
| 9,788,047 B2* | 10/2017 | Roberts | H04N 21/4312 |
| 10,126,904 B2* | 11/2018 | Agnetta | G06F 3/0481 |
| 2006/0212478 A1* | 9/2006 | Plastina | G11B 27/105 |
| 2006/0277098 A1* | 12/2006 | Chung | G06Q 30/02 |
| | | | 705/14.22 |
| 2007/0140660 A1* | 6/2007 | Lu | G11B 27/34 |
| | | | 386/230 |
| 2010/0162115 A1* | 6/2010 | Ringewald | G06F 17/30743 |
| | | | 715/716 |
| 2016/0077686 A1* | 3/2016 | Cosio | H04N 21/42204 |
| | | | 715/825 |
| 2016/0132195 A1* | 5/2016 | Seto | G06F 3/0483 |
| | | | 715/765 |

* cited by examiner

MULTIMEDIA PLAYING METHOD AND APPARATUS BASED ON ANDROID SYSTEM

FIELD OF THE DISCLOSURE

The present disclosure relates to the field of multimedia playing technologies, and more specifically, relates to a multimedia playing method and apparatus based on Android system.

BACKGROUND OF THE DISCLOSURE

A DivX Menu file is a digital multimedia compression format file in which audio information is compressed by MP3 and video information is compressed by MPEG-4 technologies. The DivX Menu file has advantages of high resolution, taking up less memory and less internet data bandwidth, and interacting with users easily, etc. Currently, playing a DivX Menu file in Android system cannot produce Menu effects, and cannot achieve interaction between the menu and a user (i.e., a user cannot click the Menu to interact with it).

SUMMARY OF THE DISCLOSURE

In light of the above, the embodiments of the present disclosure provide a multimedia playing method and apparatus based on Android system.

The multimedia playing method according to the embodiments of the present disclosure comprises: loading a source file, and parsing a file header of the source file to determine whether the source file is a predefined format file, wherein the predefined format file comprises menu information, and the menu information comprises default start menu information, at least two titles, at least one button for selecting a corresponding title and data for indicating corresponding relations between the buttons and the titles; storing the menu information if the source file is determined to be the predefined format file; obtaining the default start menu information; extracting data corresponding to the current title in the default start menu information; and playing the data corresponding to the current title.

The multimedia playing apparatus according to the embodiments of the present disclosure comprises: a loading and parsing module, configured to load a source file and parse a file header of the source file; a determining module, configured to determine whether the source file is a predefined format file, wherein the predefined format file comprises menu information, and the menu information comprises default start menu information, at least two titles, at least one button for selecting a corresponding title and data for indicating corresponding relations between the buttons and the titles; a storage module, configured to store the menu information if the determining module determines the source file to be the predefined format file; an obtaining module, configured to obtain the default start menu information, and extract data corresponding to a current title in the default start menu information; and a playing module, configured to play the data corresponding to the current title.

According to the multimedia playing method and apparatus, playing a DivX Menu file in Android system can have the Menu effects, and the Android system can respond to the events of user's click on the Menu.

DETAILED DESCRIPTION OF THE DISCLOSURE

A clear and complete description will be made on the exemplary embodiments provided by the present disclosure with references to the accompanying drawings.

Figure 1:
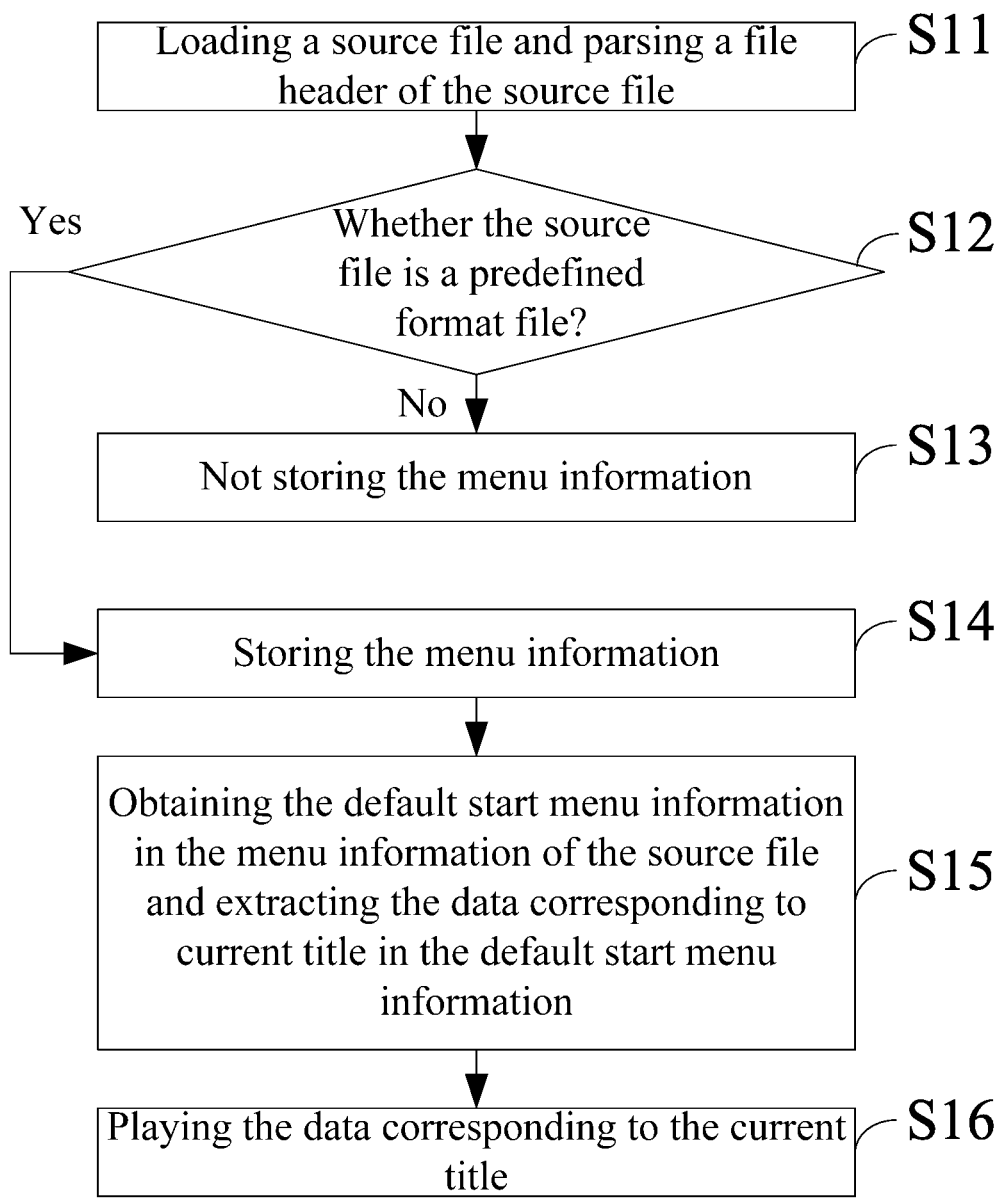
FIG. 1 is a flow chart diagram of a multimedia playing method according to a first embodiment of the present disclosure.
Figure 2:
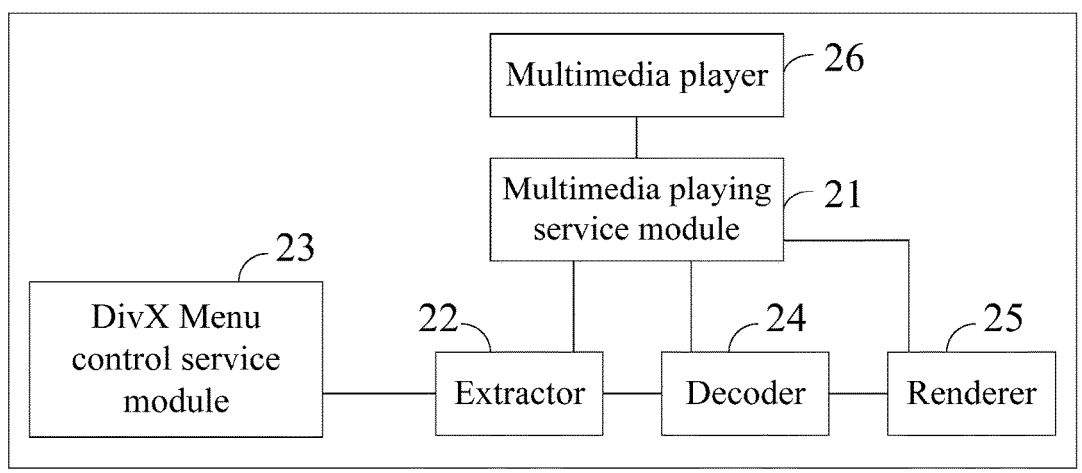
FIG. 2 is a structural diagram of a multimedia playing apparatus according to the first embodiment of the present disclosure.

The first embodiment of the present disclosure provides a multimedia playing method as shown in FIG. 1, which is utilized to play a predefined format file in Android system. The predefined format file comprises a DivX Menu file, but the present disclosure is not limited thereto. The multimedia playing method may be implemented by the multimedia playing apparatus as shown in FIG. 2, but the present disclosure is not limited thereto. Referring both to FIG. 1 and FIG. 2, the multimedia playing method comprises:

Step S11: loading a source file, and parsing a file header of the source file.

The multimedia player 26 which can be embodied as an APP or an application in actual application scenarios loads the source file to be played. Regardless of the loaded source file being an audio file, a video file or other multimedia files, they are all stored in the form of data packages or segments of data, that is, the source file certainly has a file header, a payload and a file end, wherein the payload is the data content of the source file, and the file header may not only serve as an identification indicating the start of the source file, but also indicate attribute information including the format, the occupied memory and the like of the payload or the source file, while the file end serves as an ending identification of the payload.

On the above basis, a multimedia playing service module (Awesome Player) 21 is configured to initiate an extractor 22. The extractor 22 may parse and obtain the file header of the loaded source file, and determine the format of the loaded source file according to the file header.

Step S12: determining whether the source file is a predefined format file.

The predefined format file can be, for example, a DivX Menu file, it comprises menu information, and the menu information further comprises default start menu information, at least two titles, at least one button for selecting a corresponding title and data for indicating corresponding relations between the buttons and the titles. In this embodiment, the default start menu information is the menu information of the predefined format file that is automatically played when the multimedia playing apparatus is started. The at least two titles correspond to at least two segments of multimedia streams in the source file, and can be represented by the names of the at least two segments of multimedia streams. The data is the payload of the predefined format file.

If the extractor 22 determines that the loaded source file is not the predefined format file, go to step S13. If the source file is determined to be the predefined format file, go to step S14.

Step S13: not storing the menu information.

Step S14: storing the menu information.

Step S15: obtaining by a DivX Menu control service module 23 the default start menu information in the menu information of the predefined format file, and controlling the extractor 22 to extract data corresponding to the current title in the default start menu information.

Step S16: playing the data corresponding to the current title.

Wherein, the extractor 22 extracts the data corresponding to the current title. In view of the payload of the source file has been encoded when stored, thus a decoder 24 of the multimedia playing apparatus needs to decode the data corresponding to the current title in order to acquire the decoded data. A renderer 25 is configured to render the decoded data, so as to enable the multimedia player 26 to play the rendered data.

Figure 3:
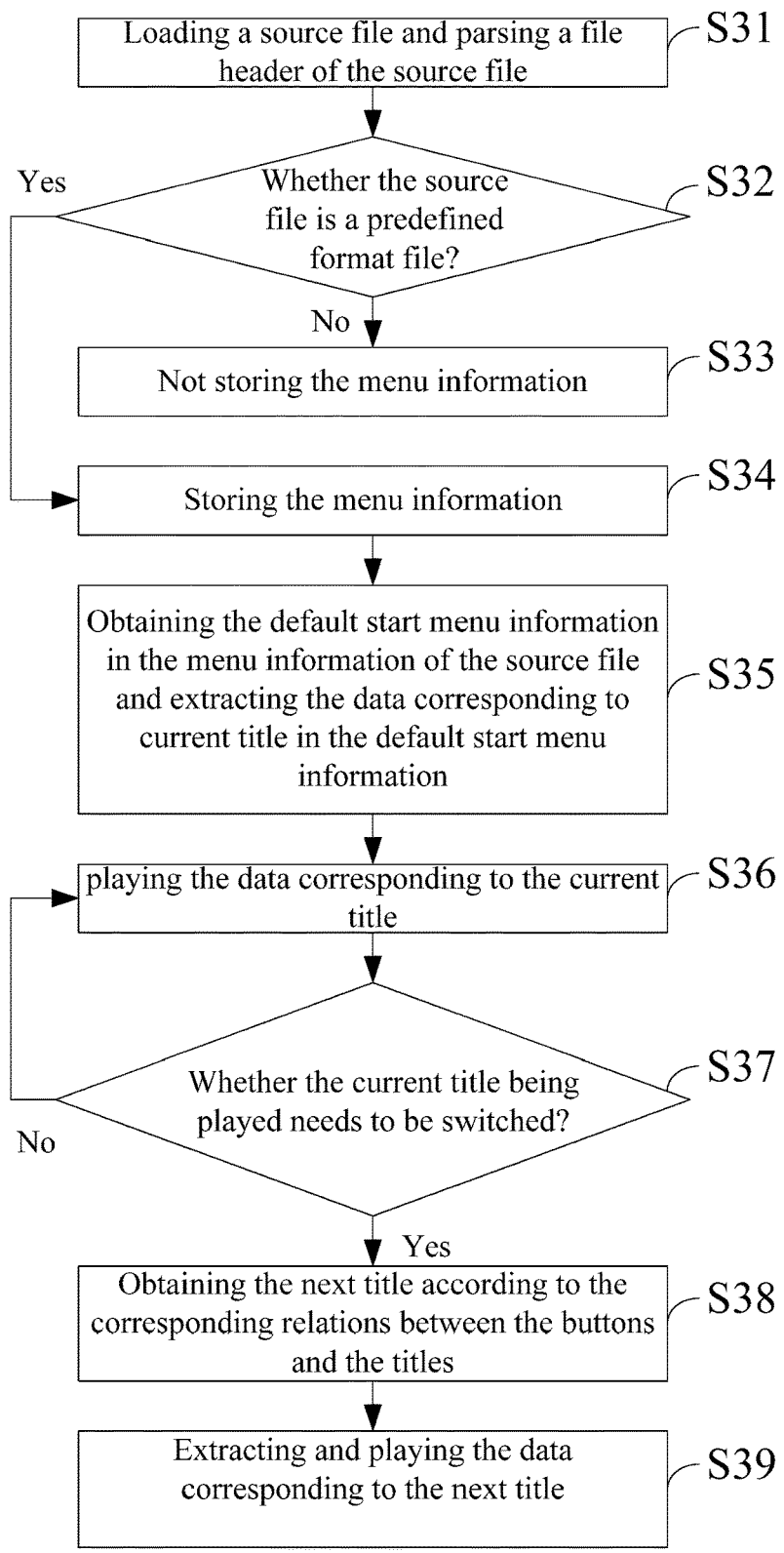
FIG. 3 is a flow chart diagram of a multimedia playing method according to a second embodiment of the present disclosure.

FIG. 3 is a flow chart diagram of a multimedia playing method according to a second embodiment of the present disclosure. The difference between the second embodiment and the first embodiment lies in that, the second embodiment can be applied to the situation that playing can be switched among one or more predefined format files. As is shown in FIG. 3, the method of this embodiment comprises:

Step S31: loading a source file, and parsing a file header of the source file.

Step S32: determining whether the source file is the predefined format file.

If the source file is determined not to be the predefined format file, go to step S33. If the source file is determined to be the predefined format file, go to step S34.

Step S33: not storing the menu information.

Step S34: storing the menu information.

Step S35: obtaining the default start menu information in the menu information of the source file, and extracting the data corresponding to the current title in the default start menu information.

Step S36: playing the data corresponding to the current title.

Step S37: determining whether it needs to switch the current title being played.

If it does not need to switch, continue with the step S36, i.e., playing the data corresponding to the current title. If it needs to switch, go to step S38.

Step S38: obtaining a next title according to the corresponding relations between the buttons and the titles.

Step S39: extracting and playing the data corresponding to the next title.

In this embodiment of the present disclosure, there are at least two circumstances in which it needs to determine whether the current title being played should be switched. For the first circumstance, the data corresponding to the next title needs to be played after the playing of the data corresponding to the current title has been finished, and the next title may be the same current title or a next title different from the current title. For example, after the playing of the data corresponding to the current title has been finished, a next title may be obtained according to the menu information and determined whether it is the same as the current title, and if it is not the same, then it is determined that the current title needs to be switched. For the second circumstance, when the data corresponding to the current title is being played, the data of the next title is switched to and played according to user's instructions, wherein the user's instructions can be obtained by the user's click operations on the buttons.

Additionally, manners of determining whether the current title being played needs to be switched comprises but not limited to: determining whether there is a click operation on the buttons. if there is a click operation on the buttons, then determine whether the next title corresponding to the click operation is the same as the current title according to the stored corresponding relationship data between the buttons and titles, i.e., the stored menu information of the predefined format file; if it is not the same, then it is determined that it needs to switch; if it is the same, then there is no need to switch, and continue to play the data corresponding to the current title.

Also referring to FIG. 2, there are at least the following two manners for the storage of the menu information of the predefined format file:

For the first storage manner, the multimedia player 26 obtains touch coordinates of the click operation, and transmits the touch coordinates to a DivX Menu control service module 23 via the multimedia playing service module 21 and the extractor 22, i.e., to store the menu information into the DivX Menu control service module 23.

In this case, the DivX Menu control service module 23 executes step S37, i.e., determines whether it needs to switch the current title being played.

Furthermore, between the steps S38 and S39, i.e., after obtaining the next title and before playing the data corresponding to the next title, the multimedia playing service module 21 in the multimedia playing apparatus transmits a playing complete message to the multimedia player 26 in order to inform the multimedia player 26 that the playing of the data corresponding to the current title has been finished or the current playing needs to be stopped to switch to the playing of the data corresponding to the next title. The multimedia player 26 terminates playing of the data corresponding to the current title according to the received playing complete message, and then reloads the source file and sequentially performs the subsequent steps.

For the second storage manner, the multimedia player 26 obtains the touch coordinates of the click operation and transmits the touch coordinates to the extractor 22 via the multimedia playing service module 21, i.e., storing the menu information into the extractor 22.

In this case, the extractor 22 determines whether it needs to switch the current title being played.

Furthermore, between the steps S38 and S39, i.e., after obtaining the next title and before playing the data corresponding to the next title, the extractor 22 transmits the playing complete message to the multimedia playing service module 21 in order to inform the multimedia player 26 that the playing of the data corresponding to the current title has been finished or the current playing needs to be stopped to switch to the playing of the data corresponding to the next title. The multimedia player 26 terminates playing of the data corresponding to the current title according to the received playing complete message, and the multimedia playing service module 21 obtains the information corresponding to the next title and reinitiates the decoder 24 and the renderer 25.

According to the present embodiment, playing a DivX Menu file in Android system can have the Menu effects, and would respond to the events of user's clipping on the Menu.

Figure 4:
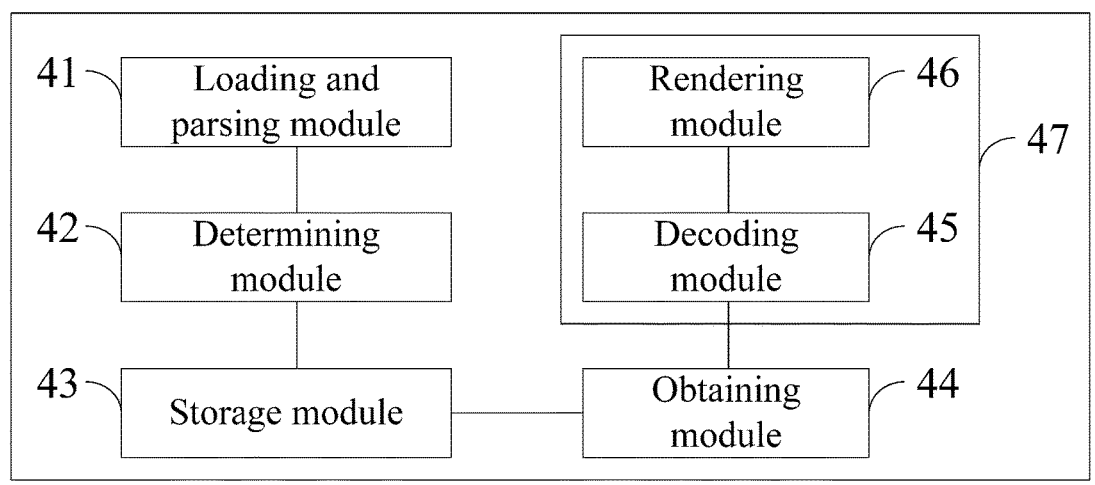
FIG. 4 is a schematic block diagram of a multimedia playing apparatus according to the second embodiment of the present disclosure.

FIG. 4 is a schematic block diagram of a multimedia playing apparatus according to the second embodiment of the present disclosure. The multimedia playing apparatus is configured to play a predefined format file in Android system. The predefined format file comprises a DivX Menu file, but the present disclosure is not limited thereto. As is shown in FIG. 4, the multimedia playing apparatus comprises a loading and parsing module 41, a determining module 42, a storage module 43, an obtaining module 44 and a playing module 47. The loading and parsing module 41 is configured to load a source file and parse a file header of the source file. The determining module 42 is configured to determine whether the source file is a predefined format file which comprises menu information, and the menu information further comprises default start menu information, at least two titles, at least one button for selecting a corresponding title and data for indicating corresponding relations between the buttons and the titles. When the determining module 42 determines the source file to be a predefined format file, the storage module 43 is configured to store the menu information. The obtaining module 44 is configured to obtain the default start menu information in the menu information of the predefined format file and extract data corresponding to a current title in the default start menu information, and the playing module 47 is configured to play the data corresponding to the current title.

The playing module 47 comprises but not limited to a decoding unit 45 and a rendering unit 46. Before the playing module 47 plays the data corresponding to the current title, the decoding unit 45 is configured to decode the data corresponding to the current title in order to obtain the decoded data. Further, the rendering unit 46 is configured to render the decoded data and then the playing module 47 plays the rendered data.

The multimedia playing apparatus of this embodiment can also be applied to the situation in which the playing is switched among one or more predefined format files. Specifically, after the playing module 47 plays the data corresponding to the current title, the determining module 42 is further configured to determine whether it needs to switch the current title being played or not, if it needs to switch, then the obtaining module 44 is configured to obtain a next title according to the corresponding relations between the buttons and the titles, and extract the data corresponding to the next title, and the playing module 47 is further configured to play the data corresponding to the next title.

In this embodiment, there are at least two circumstances in which it needs to determine whether the current title being played should be switched. For the first circumstance, the data corresponding to the next title needs to be played after the playing of the data corresponding to the current title has been finished, and the next title may be the same current title or a next title different from the current title. For example, after the playing module 47 finishes the playing of the data corresponding to the current title, the obtaining module 44 may obtain a next title according to the menu information, and the determining module 42 determines whether the next title is the same as the current title, and if it is not the same, then it is determined that the current title needs to be switched. For the second circumstance, when the data corresponding to the current title is being played, the data of the next title is switched to and played according to user's instructions, wherein the user's instructions can be obtained by the user's click operations on the buttons.

Additionally, manners for the determining module 42 to determine whether the current title being played needs to be switched or not comprises but not limited to: the determining module 42 determines whether there is a click operation on the buttons. If there is a click operation on the buttons, then the determining module 42 determines whether the next title corresponding to the click operation is the same as the current title according to the corresponding relationship data between the buttons and titles stored by the storage module 43; if it is not the same, then the determining module 42 determines that it needs to switch.

After the obtaining module 44 obtains the next title, the multimedia playing service module (not shown in FIG. 4) of the multimedia playing apparatus transmits a playing complete message to the playing module 47. The playing module 47 terminates playing the data corresponding to the current title according to the playing complete message, and the loading and parsing module 41 reloads the source file.

The method and apparatus described herein are based on Android system, but the present disclosure is not limited thereto, other operating systems can also work well.

Those skilled in the art can easily understand the specific operating processes of the various modules in the multimedia playing apparatus may refer to the corresponding processes as described in preceding method embodiments, thus further details would be omitted for convenience and brevity. Each of the various modules can be set individually or integrally onto one chip or the like physical element. Furthermore, if the above functions are to be implemented by the form of software functional unit and sailed or used as a standalone product, then it can be stored in a computer-readable storage medium, that is to say, the embodiments of the present disclosure may be implemented in the form of software products, which comprises a plurality of instructions that enable a computer device (e.g., a personal computer, a server, a network apparatus or etc.) to execute all or some of the steps of the method described in the various embodiments of the present disclosure.

In addition, it is apparent to those skilled in the art, the present disclosure also provides a multimedia player device, which comprises a non-transitory program storage medium and a processor. The non-transitory program storage medium stores a program executed by the processor to perform the method as described in above. Furthermore, it is apparent to those skilled in the art that, various modules 21, 23, 41, 42, 43, 44, 45, 46, 47 as shown in FIGS. 2 and 4 may be software modules respectively. In another aspect, it is well-known that the above various software modules inherently are stored in the non-transitory program storage medium and executed by the processor to perform the method as described in above.

What described above are only the embodiments of the present disclosure, but are not intended to limit the scope of the present disclosure. Any equivalent structures or equivalent process flow modifications that are made according to the specification and the attached drawings of the present disclosure, such as combinations of technical features in different embodiments, or any direct or indirect applications of the present disclosure in other related technical fields shall all be covered within the protection scope of the present disclosure.

What is claimed is:

1. A multimedia playing method, comprising:
   loading a source file, and parsing a file header of the source file to determine whether the source file is a predefined format file, wherein the predefined format file comprises menu information, and the menu information comprises default start menu information, at least two titles, at least one button for selecting a corresponding title and data for indicating corresponding relations between the buttons and the titles;
   storing the menu information if the source file is determined to be the predefined format file;
   obtaining the default start menu information;
   extracting data corresponding to the current title in the default start menu information;
   playing the data corresponding to the current title;

determining whether the current title being played needs to be switched;

obtaining a next title according to the data of the corresponding relations between the buttons and the titles when it is determined the current title being played needs to be switched; and extracting and playing data corresponding to the next title;

wherein the step of determining whether the current title being played needs to be switched comprises:

determining whether there is a click operation on the buttons;

determining whether the next title corresponding to the click operation is the same as the current title according to the data of the corresponding relations between the buttons and the titles when there is the click operation on the buttons;

determining that the current title being played needs to be switched when the next title is not the same as the current title.

2. The multimedia playing method of claim 1, wherein the step of playing the data corresponding to the current title comprises:

decoding the data corresponding to the current title in order to obtaining decoded data; and rendering the decoded data.

3. The multimedia playing method of claim 1, wherein the source file is a predefined format file, and the step of storing the menu information comprises:

storing the menu information into a DivX menu control service module, wherein the DivX menu control service module performs the step of determining whether the current title being played needs to be switched.

4. The multimedia playing method of claim 3, further comprising the following steps after the step of obtaining the next title:

transmitting, by a multimedia playing service module, a playing complete message to a multimedia player;

terminating, by the multimedia player, playing the data corresponding to the current title; and reloading, by the multimedia player, the source file.

5. The multimedia playing method of claim 1, wherein the source file is a predefined format file, and the step of storing the menu information comprises:

storing the menu information into an extractor, wherein the extractor performs the step of determining whether the current title being played needs to be switched.

6. The multimedia playing method of claim 5, further comprising the following steps after the step of obtaining the next title:

transmitting, by the extractor, a playing complete message to a multimedia playing service module;

terminating, by the multimedia playing service module, the playing of the data corresponding to the current title according to the playing complete message; and obtaining, by the multimedia playing service module, information corresponding to the next title, and reinitializing a decoder and a renderer.

7. The multimedia playing method of claim 1, further comprising:

obtaining a next title according to the menu information when the playing of the data corresponding to the current title has been finished;

determining whether the next title is the same as the current title; and determining the current title needs to be switched when the next title is determined to be not the same as the current title.

8. The multimedia playing method of claim 1, wherein the predefined format file is a DivX Menu file.

9. A multimedia playing apparatus, comprising:

a loading and parsing module, configured to load a source file and parse a file header of the source file;

a determining module, configured to determine whether the source file is a predefined format file, wherein the predefined format file comprises menu information, and the menu information comprises default start menu information, at least two titles, at least one button for selecting a corresponding title and data for indicating corresponding relations between the buttons and the titles;

a storage module, configured to store the menu information if the determining module determines the source file to be the predefined format file;

an obtaining module, configured to obtain the default start menu information, and extract data corresponding to a current title in the default start menu information; and a playing module, configured to play the data corresponding to the current title;

wherein the determining module is further configured to determine whether the current title being played needs to be switched, and when it is determined that the current title being played needs to be switched, the obtaining module is configured to obtain a next title according to the corresponding relations between the buttons and titles, and extract data corresponding to the next title, and the playing module is further configured to play the data corresponding to the next title; and wherein the determining module determines whether there is a click operation on the buttons, if it is determined that there is the click operation on the buttons, then it is further determined whether the next title corresponding to the click operation is the same as the current title according to the stored data of corresponding relations between the buttons and the titles, and when the next title is determined to be not the same as the current title, then it is determined that the current title being played needs to be switched.

10. The multimedia playing apparatus of claim 9, wherein the playing module comprises a decoding unit and a rendering unit, the decoding unit is configured to decode the data corresponding to the current title to obtain decoded data, the rendering unit is configured to render the decoded data, and the playing module is configured to play the rendered data.

11. The multimedia playing apparatus of claim 9, wherein the apparatus further comprises a multimedia playing service module, and after the obtaining module obtains the next title, the multimedia playing service module transmits a playing complete module to the playing module such that the playing module terminates the playing of the data corresponding to the current title and reloads the source file.

12. The multimedia playing apparatus of claim 9, wherein after the playing module has finished the playing of the data corresponding to the current title, the obtaining module is further configured to obtain a next title according to the menu information, and the determining module is configured to determine whether the next title is the same as the current title, and if the next title is not the same as the current title, then it is determined that the current title needs to be switched.

13. The multimedia playing apparatus of the claim 9, wherein the predefined format file is a DivX Menu file.

14. A non-transitory machine-readable storage medium having stored thereon a computer program comprising at least one code section for implementing a multimedia playing method, the at least one code section being executable by a machine for causing the machine to perform acts of:

loading a source file, and parsing a file header of the source file to determine whether the source file is a predefined format file, wherein the predefined format file comprises menu information, and the menu information comprises default start menu information, at least two titles, at least one button for selecting a corresponding title and data for indicating corresponding relations between the buttons and the titles;

storing the menu information if the source file is determined to be the predefined format file;

obtaining the default start menu information;

extracting data corresponding to the current title in the default start menu information;

playing the data corresponding to the current title;

determining whether the current title being played needs to be switched;

obtaining a next title according to the data of the corresponding relations between the buttons and the titles when it is determined the current title being played needs to be switched; and extracting and playing data corresponding to the next title;

wherein the act of determining whether the current title being played needs to be switched comprises:

determining whether there is a click operation on the buttons;

determining whether the next title corresponding to the click operation is the same as the current title according to the data of the corresponding relations between the buttons and the titles when there is the click operation on the buttons;

determining that the current title being played needs to be switched when the next title is not the same as the current title.

15. The non-transitory machine-readable storage medium of claim 14, wherein the act of playing the data corresponding to the current title comprises:

decoding the data corresponding to the current title in order to obtain decoded data; and rendering the decoded data.

\* \* \* \* \*